(12) United States Patent
Castellino et al.

(10) Patent No.: US 10,183,246 B2
(45) Date of Patent: Jan. 22, 2019

(54) METHOD FOR PREPARING A CATALYZED FABRIC FILTER AND A CATALYZED FABRIC FILTER

(71) Applicant: Haldor Topsøe A/S, Kgs. Lyngby (DK)

(72) Inventors: Francesco Castellino, Birkerød (DK); Thomas Holten Kollin, Brønshøj (DK)

(73) Assignee: Haldor Topsoe A/S, Lyngby (DK)

( * ) Notice: Subject to any disclaimer, the term of this patent is extended or adjusted under 35 U.S.C. 154(b) by 23 days.

(21) Appl. No.: 15/513,214

(22) PCT Filed: Jun. 25, 2015

(86) PCT No.: PCT/EP2015/064416
§ 371 (c)(1),
(2) Date: Mar. 22, 2017

(87) PCT Pub. No.: WO2016/058713
PCT Pub. Date: Apr. 21, 2016

(65) Prior Publication Data
US 2018/0229165 A1 Aug. 16, 2018

(30) Foreign Application Priority Data

Oct. 14, 2014 (DK) ................................ 2014 00587

(51) Int. Cl.
| | | |
|---|---|---|
| *B01D 39/20* | (2006.01) | |
| *B01D 39/08* | (2006.01) | |
| *B01J 37/02* | (2006.01) | |
| *B01J 23/00* | (2006.01) | |
| *B01J 23/22* | (2006.01) | |
| *B01J 23/28* | (2006.01) | |
| *B01J 23/30* | (2006.01) | |
| *B01J 23/63* | (2006.01) | |
| *B01J 23/648* | (2006.01) | |
| *B01J 23/652* | (2006.01) | |
| *B01J 35/06* | (2006.01) | |
| *B01J 37/00* | (2006.01) | |

(52) U.S. Cl.
CPC ....... *B01D 39/2017* (2013.01); *B01D 39/086* (2013.01); *B01J 23/002* (2013.01); *B01J 23/22* (2013.01); *B01J 23/28* (2013.01); *B01J 23/30* (2013.01); *B01J 23/63* (2013.01); *B01J 23/6482* (2013.01); *B01J 23/6525* (2013.01); *B01J 23/6527* (2013.01); *B01J 35/06* (2013.01); *B01J 37/0036* (2013.01); *B01J 37/0213* (2013.01); *B01J 37/0219* (2013.01); *B01D 2239/0464* (2013.01); *B01D 2239/0492* (2013.01); *B01J 23/652* (2013.01); *B01J 2523/00* (2013.01)

(58) Field of Classification Search
CPC ........ B01D 39/2017; B01D 2239/0464; B01D 39/086; B01D 2239/0492; B01J 35/06; B01J 37/0036; B01J 37/0213; B01J 37/0219
See application file for complete search history.

(56) References Cited

U.S. PATENT DOCUMENTS

| | | |
|---|---|---|
| 6,264,045 B1 | 7/2001 | Wilson et al. |
| 6,331,351 B1 | 12/2001 | Waters et al. |
| 6,342,465 B1 | 1/2002 | Klein et al. |
| 7,879,758 B2 * | 2/2011 | Heidenreich ...... B01D 39/2075 502/350 |
| 8,066,787 B2 | 11/2011 | Althofer |
| 2004/0176246 A1 | 9/2004 | Shirk et al. |

FOREIGN PATENT DOCUMENTS

| | | |
|---|---|---|
| CN | 1220917 A | 6/1999 |
| CN | 1771088 A | 5/2006 |
| DE | 20 2005 013 330 U1 | 12/2006 |
| JP | 9-220466 A | 8/1997 |
| JP | 2002-18241 A | 1/2002 |
| JP | 2013-128863 A | 7/2013 |
| TW | 402515 B | 8/2000 |
| TW | I364491 B | 5/2012 |
| WO | WO 2012/059211 A1 | 5/2012 |
| WO | WO 2013/182255 A1 | 12/2013 |

* cited by examiner

*Primary Examiner* — Robert Clemente
(74) *Attorney, Agent, or Firm* — Blank Rome LLP

(57) ABSTRACT

A catalyzed fabric filter substrate and a method of preparing the substrate comprising the steps of a) providing a fabric filter substrate b) providing an aqueous impregnation liquid comprising an aqueous hydrosol of one or more catalyst metal precursor compounds dispersed on nanoparticles of an oxidic metal carrier, a surfactant and a dispersing agent selected from the group of primary amines; c) impregnating the fabric filter substrate with the impregnation liquid; and d) drying and thermal activating the impregnated fabric filter substrate at a temperature below 300° C. to convert the one or more metal compounds of the catalyst precursor to their catalytically active form.

16 Claims, No Drawings

METHOD FOR PREPARING A CATALYZED FABRIC FILTER AND A CATALYZED FABRIC FILTER

The present invention relates to the preparation of a catalyzed fabric filter and a catalyzed fabric filter prepared using this method.

Fabric filters are typically employed in the removal of particulate materials from flue gases emerging from industrial processes and combustion processes.

These filters are either produced with woven or non-woven fabric fibrous material providing a porous filtration media for capturing fine particulate matter without resulting in an undesired high pressure drop in the gases passing through the media.

Frequently off- and flue gases contain additionally gaseous compounds, which cause environmental or health hazards.

It has, thus, been a desire to reduce or remove the content of both particulate matter and hazardous compounds in off- and flue gasses simultaneously.

For this purpose, filtration media catalyzed with catalysts active in the conversion of hazardous compounds to less or harmless compounds have been employed in cleaning systems in the industry and automotive applications.

Fabric filters in form of e.g. filter bags are extensively used in many industries for removal of particulate matter from process gases. They are one of the most efficient types of dust collectors available and can achieve collection efficiencies of more than 99% for particulates. The filters can be made from various woven, non-woven or felted materials or mixtures thereof comprising natural fibres, synthetic fibres, or other fibres such as glass fibres, ceramic or metallic fibres.

The high particulate removal efficiency of fabric filters is partly due to the dust cake formed on the surfaces of the filter bags and partly due to the filter bag composition and production quality as well as the quality of the fabric filter construction itself. The fabric provides a surface on which dust particulates collect. Due to the composition of the fibers constituting the filter, these are typically operated at temperatures lower than 280° C., which causes several requirements and limitations to the methods for applications of catalysts onto the fabric filter material.

In the preparation of catalyzed materials like fabric materials, aqueous impregnation liquids are preferred because of environmental and health reasons.

To this end, many of the fibres used in the manufacture of fabric filter consist of water repelling materials, which adds additionally requirements to application of catalytic materials onto the fibres when employing impregnation methods with aqueous impregnation liquids.

When preparing catalyzed fabric filters it is important to disperse the catalytic material across the entire thickness of the fabric filter substrate in an amount to provide optimal catalytic efficiency and to prevent formation of excessive pressure drop by amounts of the catalytic material coated on the filter substrate. Beside causing a high pressure drop during operation, thick layers of catalytic material on the filter substrate are also problematic during regeneration of the filter by removing captured particulate matter with the risk of the catalytic material spalls off resulting in lower catalytic efficiency during a subsequent operation cycle.

It is therefore necessary to apply the catalytic material on the fabric fibers within the fabric filter wall and/or on the filter surface in a layer sufficiently thin to prevent excessive pressure drop and spalling off of the catalyst during operation and regeneration of the fabric filter.

It is commonly accepted in the art of catalysis that an effective supported catalyst requires coverage of the catalytic active material as a monolayer on surface of catalyst support particles. Thereby, it is possible to limit the required amount of supported catalyst on a fabric substrate.

Additionally, it is required that the catalyst support particles do not form large agglomerates during preparation and storage of an impregnation liquid.

As mentioned above, a number of the fiber materials used in the preparation of fabric filters are water repelling and aqueous impregnation liquids typically employed in e.g. catalyzing ceramic surfaces have a limited or no wetting ability to spread readily and uniformly over the surface of the fibres to form a thin and continuous catalyst layer.

Thus, it is a general object of the invention to provide a method for the preparation of catalyzed fabric filters by impregnation of the fabric material with an aqueous impregnation liquid containing catalytic active material/s that complies with the above mentioned requirements.

We have found that these requirements can be fulfilled by employing an aqueous impregnation solution comprising an aqueous sol of one or more catalyst metal precursor compounds dispersed on nanoparticles of an oxidic metal carrier hydrosol, a surfactant and a dispersing agent selected from the group of primary amines.

By the term "nanoparticles" used hereinbefore and in the following description, we understand particles of up to 1000 nanometers in size. A nanoparticle is defined as a small object that behaves as a whole unit with respect to its transport and properties.

Pursuant to the above findings, this invention provides a method for preparing a catalyzed fabric filter comprising the steps of a) providing a fabric filter substrate b) providing an aqueous impregnation liquid comprising an aqueous hydrosol of one or more catalyst metal precursor compounds dispersed on nanoparticles of an oxidic metal carrier, a dispersing agent comprising one or more primary amines and a surfactant;

c) impregnating the fabric filter substrate with the impregnation liquid; and d) drying and thermally activating the impregnated fabric filter substrate at a temperature below 300° C. to convert the one or more metal compounds of the catalyst precursor to their catalytically active form.

Preferred embodiments of the invention are disclosed and discussed in the following. These embodiments can either be employed each alone or in combination thereof.

The thermally activation of the impregnated fabric filter substrate can be performed either before installation of the catalyzed fabric filter substrate or after installation of the catalyzed fabric filter substrate in a filtration unit.

Preferably, the thermal activation temperature is between 250 and 280° C.

A number of fabric filter substrates have been found to have low thermal stability while other materials deactivate the catalytic material.

Thus, a preferred fabric filter substrate consists of woven or non-woven glass fibres coated with a polymeric material, in particular polytetrafluoroethylene. This substrate can withstand temperatures of up to 280° C.

The particle-containing off or flue gases very often contain nitrogen oxides (NOx), volatile organic compounds (VOC), $SO_2$, CO, Hg, $NH_3$, dioxins and furans, in concentrations that have to be reduced depending on local legislation. The abatement of gaseous contaminants like NOx, VOC, dioxins and furans can be effectively carried out by contact with a catalyst.

In preferred embodiments of the invention the one or more catalyst metal precursor compounds comprise ammonium metavanadate, ammonium metatungstate, ammonium heptamolybdate tetra hydrate, palladium nitrate, tetraammineplatinum(II) hydrogen carbonate or mixtures thereof and the catalytically active form of the catalyst metal precursor compound comprises one or more of vanadium oxide, tungsten oxide, molybdenum oxide, palladium and platinum in the oxidic and/or metallic form.

In particular, vanadium oxide-based catalysts supported on titania or alumina are commonly used catalysts for NOx reduction by selective reduction of NOx with NH3 in stationary and automotive applications. Efficient oxidation catalysts are palladium or platinum in their oxidic and/or metallic form.

It is thus further preferred that the one or more catalyst precursor metal compound consists of ammonium metavanadate and palladium nitrate and the catalytically active form of the catalyst metal precursor compound consists of vanadium pentoxide and palladium.

These catalysts are active both in the removal of hydrocarbons (VOC) and carbon monoxide and in the removal of NOx by the SCR reaction with $NH_3$.

The oxidic metal carrier comprises preferably oxides of titanium, aluminum, cerium, zirconium or mixtures and compounds thereof.

It is further preferred that the oxidic metal carrier consists of nanoparticles of titanium oxide with a particle size of between 10 and 150 nm.

Catalysts consisting of palladium and vanadium pentoxide supported on titania ($TiO_2$) are preferred for the following reasons. The $Pd/V_2O_5/TiO_2$ catalyst has i) dual functionality (removal of NOx and removal of VOC, volatile organic compounds); ii) a S-tolerance; and iii) a lower $SO_2$ oxidation activity compared to other catalyst compositions.

In the preparation of the impregnation liquid as disclosed in more detail below a part of the oxidic metal carrier hydrosol in the impregnation solution gelates during storage and agglomerates to a larger particle size than the preferred size. The primary amine dispersing agent prevents agglomeration or breaks down already formed agglomerates.

The primary amine is preferably soluble in the aqueous impregnation liquid, when having been added in an amount resulting in the above disclosed purpose. Primary amines with fewer than seven carbon atoms are water soluble, preferred primary amines for use in the invention are mono methyl amine, mono ethyl amine, mono propyl amine, mono butyl amine or mixtures thereof. Of these, the most preferred dispersing agent is mono ethyl amine.

Good results are obtained when the primary amine dispersing agent is added to the impregnation liquid in an amount resulting in a pH value of the impregnation liquid above 7.

In all the above embodiments of the invention it is further preferred that the prepared catalyzed fabric filter comprises from about 5 to about 8% by weight of catalytically active material.

As already mention hereinbefore, an effective catalyst requires a monolayer coverage of the catalytically active material on the oxidic metal carrier. Formation of excess crystalline catalytically active material on the carrier should be avoided. This is often obtained by thermal dispersion e.g. impregnation of a $TiO_2$ carrier particles with a vanadium oxalate solution followed by heating to 420° C. However, this approach is unsuitable with fabric filters due to temperature restrictions, T≤300° C.

A high dispersion of catalytically active material after thermal activation at low temperatures is possible when employing the so called equilibrium deposition filtration (EDF) method in combination with the primary amine dispersing agent. In this method the electrostatic force of attraction between oppositely charged metal compounds is utilized to bind one metal compound on surface of the oppositely charge metal compound in finely dispersed form.

E.g. $TiO_2$ and $V_xO_y^{z-}$ have opposite surface charges in the pH interval of 4 to 6. Hence, the electrostatic force of attraction facilitates deposition of $V_xO_y^{z-}$ onto $TiO_2$. The limited solubility of $V_xO_y^{z-}$ is circumvented by the principal of Le Chatelier. As $V_xO_y^{z-}$ binds to $Ti-OH_2^+$ sites, new $V_xO_y^{z-}$ ions are solubilized. This continuous process occurs at room temperature and requires nothing but stirring and pH regulation.

Thus, in still a preferred embodiment of the invention the impregnation liquid is prepared by the steps of i) adding the one or more metal compound of a catalyst precursor and the oxidic metal carrier to water and continuously adding an acid to the liquid to maintain the pH of the liquid at a value where the surface charge of the one or more catalyst precursor metal compound is negative and the Zeta potential of the oxidic metal carrier is positive;

ii) adsorbing the one or more catalyst precursor metal compound onto surface of the oxidic metal carrier;

iii) adding the dispersing agent to the thus prepared solution in an amount to obtain a pH value above 7 of the thus prepared impregnation liquid; and subsequently iv) if present in the impregnation liquid, adding the salt of palladium and/or platinum to the impregnation liquid as prepared in step (iii).

Preferably, the pH value in step (i) and (ii) is maintained at between 4.0 and 4.3.

The invention provides additionally a catalyzed fabric filter substrate prepared by a method according to anyone of the above disclosed features and embodiments.

The catalyzed fabric filter substrate is preferably in form of a filter bag.

The invention is described in more detail in the following examples.

EXAMPLE 1

Preparation of a Ammonium Vanadate/Titania Containing Impregnation Liquid 1. 37.26 kg demineralized water is mixed with 3.11 kg $NH_4VO_3$.
2. 29.62 kg of a slurry of pearl milled TiO2 (LOI=18 wt % $TiO_2$) is added under continuous stirring. The $NH_4VO_3/TiO_2$-ratio is 0.58.
3. The pH is monitored and increases continuously.
4. The pH is adjusted with concentrated nitric acid in the interval of 4.0-4.3.
5. After a few hours the pH of the liquid remains constant and the liquid is left under constant stirring for at least 24 hours. However, the pH needs adjustment every 3 hours.

The resulting liquid has a red color and a yield point (Q~2-4 Pa).

6. 1.84 kg Ethylamine (70% in water) is added (or until pH~9.2-9.5).

The liquid becomes ivory white and very fluid (Q<1 and µ~1 mPas).

Fabric filter bags made of glass fibres coated with Teflon® are impregnated with the liquid. These filter bags are extremely hydrophobic and considerable amounts of surfactant are needed for successful impregnation.

7. 1.96 kg Softanol-90 surfactant is added.
8. Wetting tests are performed by adding a few drops of the liquid to the filter bag material.

If the wetting tests fails, additional Softanol-90 must be added.

EXAMPLE 2

Preparation of a Palladium/Ammonium Vanadate/Titania Containing Impregnation Liquid In this example 3635 wt ppm Pd per amount titania in the impregnation liquid was added to the impregnation liquid by the steps described below. Palladium was available as an aqueous solution of $Pd(NO_3)_2$ containing 16.9 wt % Pd.

1. The desired amount of Pd was calculated; 3635 ppm*$4.64*10^3$ g/$10^6$ ppm=16.87 g Pd
A 16.9 wt % Pd solution was available and 16.37 g Pd/0.169=99.8 g solution was extracted.
2. The Pd solution was diluted with 3 kg water to a Pd solution containing 0.54% by weight Pd.
3. An impregnation liquid was then prepared by the same procedure described in Example 1, with the exception that 3 kg less water have been added to the impregnation liquid and the pearl milled slurry contained 20.65% by weight of $TiO_2$.
4. The entire amount of the palladium solution prepared in step 2 was added to the impregnation liquid prepared in step 3 after pH adjustments with mono ethylamine. The Pd solution was added drop wise by means of a funnel. During addition of the Pd solution, the liquid was continuously stirred.
5. Softanol-90 surfactant was finally added and the wetting test was performed.

The invention claimed is:

1. A method for preparing a catalyzed fabric filter comprising the steps of
   a) providing a fabric filter substrate
   b) providing an aqueous impregnation liquid comprising an aqueous hydrosol of one or more catalyst metal precursor compounds dispersed on nanoparticles of an oxidic metal carrier, a dispersing agent comprising one or more primary amines and a surfactant;
   c) impregnating the fabric filter substrate with the impregnation liquid; and
   d) drying and thermally activating the impregnated fabric filter substrate at a temperature below 300° C. to convert the one or more metal compounds of the catalyst precursor to their catalytically active form.

2. The method of claim 1, wherein the thermally activation of the impregnated fabric substrate is performed prior to or subsequent to installation of the impregnated fabric substrate in a filtration unit.

3. The method of claim 1, wherein the fabric filter substrate consists of woven or non-woven glass fibres coated with a polymeric material.

4. The method of claim 3, wherein the polymeric material consists of polytetrafluoroethylene.

5. The method of claim 1, wherein the one or more catalyst metal precursor compounds comprise ammonium metavanadate, ammonium metatungstate, ammonium heptamolybdate, palladium nitrate, tetraammineplatinum(II) hydrogen carbonate or mixtures thereof.

6. The method of claim 1, wherein the catalytically active form of the one or more catalyst metal precursor compounds comprises one or more of vanadium oxide, tungsten oxide, molybdenum oxide, palladium and platinum in the oxidic and/or metallic form.

7. The method of claim 6, wherein the catalytically active form of the one or more catalyst metal precursor compounds consists of vanadium pentoxide and palladium in metallic and/or oxidic form.

8. The method of claim 1, wherein the oxidic metal carrier comprises oxides of titanium, aluminum, cerium, zirconium or mixtures and compounds thereof.

9. The method of claim 8, wherein the oxidic metal carrier consists of nanoparticles of titanium oxide with a particle size of between 10 and 150 nm.

10. The method of claim 1, wherein the dispersing agent comprises a primary amine selected from one or more of the group consisting of mono methyl amine, mono ethyl amine, mono propyl amine and mono butyl amine.

11. The method of claim 10, wherein the dispersing agent consists of mono ethyl amine.

12. The method of claim 1, wherein the dispersing agent is added to the impregnation liquid in an amount resulting in a pH value above 7 of the impregnation liquid.

13. The method of claim 1, wherein the catalyzed fabric substrate comprises from about 5 to about 8% by weight of catalytically active material.

14. The method of claim 1, wherein the aqueous impregnation liquid is prepared by the steps of
   i) adding the one or more catalyst metal precursor compounds and the oxidic metal carrier to water and continuously adding an acid to the liquid to maintain the pH of the liquid at a value where the surface charge of the one or more catalyst precursor metal compound is negative and the Zeta potential of the oxidic metal carrier is positive;
   ii) adsorbing the at the one or more catalyst metal precursor compound onto the surface of the oxidic metal carrier;
   iii) adding the dispersing agent to the thus prepared liquid in an amount to obtain a pH value above 7 of the thus prepared impregnation liquid; and subsequently
   iv) if palladium and/or platinum are present in the impregnation liquid, adding a solution comprising a salt of palladium and/or platinum to the impregnation liquid prepared in step (iii).

15. The method of claim 14, wherein the pH value in step (i) and (ii) is maintained between 4.0 and 4.3.

16. The method of claim 1, wherein the one or more catalyst precursor metal compounds are ammonium metavanadate and palladium nitrate.

* * * * *